US007260685B2

(12) United States Patent
Lee et al.

(10) Patent No.: US 7,260,685 B2
(45) Date of Patent: Aug. 21, 2007

(54) MEMORY HUB AND ACCESS METHOD HAVING INTERNAL PREFETCH BUFFERS

(75) Inventors: Terry R. Lee, Boise, ID (US); Joseph Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 156 days.

(21) Appl. No.: 10/601,252

(22) Filed: Jun. 20, 2003

(65) Prior Publication Data

US 2004/0260909 A1 Dec. 23, 2004

(51) Int. Cl.
*G06F 12/06* (2006.01)

(52) U.S. Cl. ........................................ 711/137; 709/250
(58) Field of Classification Search ................. 711/137, 711/113, 112, 114, 154; 709/104, 233, 250, 709/229; 710/3, 22, 100
See application file for complete search history.

(56) References Cited

U.S. PATENT DOCUMENTS

| 3,742,253 | A | 6/1973  | Kronies ..................... 307/247 |
| 4,045,781 | A | 8/1977  | Levy et al. ................. 364/200 |
| 4,240,143 | A | 12/1980 | Besemer et al. ............ 364/200 |
| 4,245,306 | A | 1/1981  | Besemer et al. ............ 364/200 |
| 4,253,144 | A | 2/1981  | Bellamy et al. ............ 364/200 |
| 4,253,146 | A | 2/1981  | Bellamy et al. ............ 364/200 |
| 4,608,702 | A | 8/1986  | Hirzel et al. ................ 375/110 |

(Continued)

FOREIGN PATENT DOCUMENTS

| EP | 0849685 A2 | 6/1998 |
| JP | 2001265539 A | 9/2001 |
| WO | WO 93/19422 | 9/1993 |
| WO | WO 98/57489 | 12/1998 |
| WO | WO 02/27499 A2 | 4/2002 |

OTHER PUBLICATIONS

Intel, "Flash Memory PCI Add–In Card for Embedded Systems", Application Note AP–758, Sep., 1997, pp. i–13.
Shanley, T. et al., "PCI System Architecture", Third Edition, Mindshare, Inc., 1995, pp. 24–25.
"Free: On–Line Dictionary of Computing" entry Flash Erasable Programmable Read–Only Memory, online May 17, 2004 [http://foldoc.doc.ic.ac.uk/foldoc/foldoc.cgi?flash+ memory].
Intel, "Intel 840 Chipset: 82840 Memory Controller Hub (MCH)", Datasheet, Oct. 1999, pp. 1–178.
Micron Technology, Inc., Synchronous DRAM Module 512MB/1GB (×72, ECC) 168–PIN Registered FBGA SDRAM DIMM, Micron Technology, Inc., 2002, pp. 1–23.

*Primary Examiner*—Pierre-Michel Bataille
(74) *Attorney, Agent, or Firm*—Dorsey & Whitney LLP

(57) ABSTRACT

A memory module includes a memory hub coupled to several memory devices. The memory hub includes history logic that predicts on the basis of read memory requests which addresses in the memory devices from which date are likely to be subsequently read. The history logic applies prefetch suggestions corresponding to the predicted addresses to a memory sequencer, which uses the prefetch suggestions to generate prefetch requests that are coupled to the memory devices. Data read from the memory devices responsive to the prefetch suggestions are stored in a prefetch buffer. Tag logic stores prefetch addresses corresponding to addresses from which data have been prefetched. The tag logic compares the memory request addresses to the prefetch addresses to determine if the requested read data are stored in the prefetch buffer. If so, the requested data are read from the prefetch buffer. Otherwise, the requested data are read from the memory devices.

53 Claims, 2 Drawing Sheets

U.S. PATENT DOCUMENTS

| | | | |
|---|---|---|---|
| 4,707,823 A | 11/1987 | Holdren et al. | 370/1 |
| 4,724,520 A | 2/1988 | Athanas et al. | 364/200 |
| 4,831,520 A | 5/1989 | Rubinfeld et al. | 364/200 |
| 4,891,808 A | 1/1990 | Williams | 370/112 |
| 4,930,128 A | 5/1990 | Suzuki et al. | 371/12 |
| 4,953,930 A | 9/1990 | Ramsey et al. | 350/96.11 |
| 5,241,506 A | 8/1993 | Motegi et al. | 365/210 |
| 5,243,703 A | 9/1993 | Farmwald et al. | 395/325 |
| 5,251,303 A | 10/1993 | Fogg, Jr. et al. | 395/275 |
| 5,269,022 A | 12/1993 | Shinjo et al. | 395/700 |
| 5,313,590 A | 5/1994 | Taylor | 395/325 |
| 5,317,752 A | 5/1994 | Jewett et al. | 395/750 |
| 5,319,755 A | 6/1994 | Farmwald et al. | 395/325 |
| 5,327,553 A | 7/1994 | Jewett et al. | 395/575 |
| 5,355,391 A | 10/1994 | Horowitz et al. | 375/36 |
| 5,432,823 A | 7/1995 | Gasbarro et al. | 375/356 |
| 5,432,907 A | 7/1995 | Picazo, Jr. et al. | 395/200 |
| 5,442,770 A | 8/1995 | Barratt | 395/403 |
| 5,461,627 A | 10/1995 | Rypinski | 370/95.2 |
| 5,465,229 A | 11/1995 | Bechtolsheim et al. | 345/477 |
| 5,479,370 A | 12/1995 | Furuyama et al. | 365/189.12 |
| 5,497,476 A | 3/1996 | Oldfield et al. | 395/439 |
| 5,502,621 A | 3/1996 | Schumacher et al. | 361/760 |
| 5,544,319 A | 8/1996 | Acton et al. | 395/200.07 |
| 5,566,325 A | 10/1996 | Bruce, II et al. | 395/494 |
| 5,577,220 A | 11/1996 | Combs et al. | 395/416 |
| 5,581,767 A | 12/1996 | Katsuki et al. | 395/800 |
| 5,606,717 A | 2/1997 | Farmwald et al. | 395/856 |
| 5,638,334 A | 6/1997 | Farmwald et al. | 365/230.03 |
| 5,638,534 A | 6/1997 | Mote, Jr. | 395/485 |
| 5,659,798 A | 8/1997 | Blumrich et al. | 395/846 |
| 5,687,325 A | 11/1997 | Chang | 395/284 |
| 5,706,224 A | 1/1998 | Srinivasan et al. | 365/49 |
| 5,710,733 A | 1/1998 | Chengson et al. | 365/52 |
| 5,715,456 A | 2/1998 | Bennett et al. | 395/652 |
| 5,729,709 A | 3/1998 | Harness | 395/405 |
| 5,748,616 A | 5/1998 | Riley | 370/242 |
| 5,796,413 A | 8/1998 | Shipp et al. | 345/522 |
| 5,818,844 A | 10/1998 | Singh et al. | 370/463 |
| 5,819,304 A | 10/1998 | Nilsen et al. | 711/5 |
| 5,822,255 A | 10/1998 | Uchida | 365/194 |
| 5,832,250 A | 11/1998 | Whittaker | 395/471 |
| 5,875,352 A | 2/1999 | Gentry et al. | 395/843 |
| 5,875,454 A | 2/1999 | Craft et al. | 711/113 |
| 5,887,159 A | 3/1999 | Burrows | 395/567 |
| 5,889,714 A | 3/1999 | Schumann et al. | 365/203 |
| 5,928,343 A | 7/1999 | Farmwald et al. | 710/104 |
| 5,963,942 A | 10/1999 | Igata | 707/6 |
| 5,966,724 A | 10/1999 | Ryan | 711/105 |
| 5,973,935 A | 10/1999 | Schoenfeld et al. | 361/813 |
| 5,973,951 A | 10/1999 | Bechtolsheim et al. | 365/52 |
| 5,978,567 A | 11/1999 | Rebane et al. | 395/200.49 |
| 5,987,196 A | 11/1999 | Noble | 385/14 |
| 6,011,741 A | 1/2000 | Wallace et al. | 365/221 |
| 6,023,726 A | 2/2000 | Saksena | 709/219 |
| 6,029,250 A | 2/2000 | Keeth | 713/400 |
| 6,031,241 A * | 2/2000 | Silfvast et al. | 250/504 R |
| 6,033,951 A | 3/2000 | Chao | 438/253 |
| 6,038,630 A | 3/2000 | Foster et al. | 710/132 |
| 6,061,263 A | 5/2000 | Boaz et al. | 365/51 |
| 6,061,296 A | 5/2000 | Ternullo, Jr. et al. | 365/233 |
| 6,067,262 A | 5/2000 | Irrinki et al. | 365/201 |
| 6,067,649 A | 5/2000 | Goodwin | 714/718 |
| 6,073,190 A | 6/2000 | Rooney | 710/56 |
| 6,076,139 A * | 6/2000 | Welker et al. | 711/104 |
| 6,079,008 A | 6/2000 | Clery, III | 712/11 |
| 6,092,158 A | 7/2000 | Harriman et al. | 711/151 |
| 6,098,158 A | 8/2000 | Lay et al. | 711/162 |
| 6,105,075 A | 8/2000 | Ghaffari | 710/5 |
| 6,111,757 A | 8/2000 | Dell et al. | 361/737 |
| 6,125,431 A | 9/2000 | Kobayashi | 711/154 |
| 6,128,703 A | 10/2000 | Bourekas et al. | 711/138 |
| 6,131,149 A | 10/2000 | Lu et al. | 711/167 |
| 6,134,624 A | 10/2000 | Burns et al. | 710/131 |
| 6,137,709 A | 10/2000 | Boaz et al. | 365/51 |
| 6,144,587 A | 11/2000 | Yoshida | 365/189.05 |
| 6,145,033 A | 11/2000 | Chee | 710/57 |
| 6,167,465 A | 12/2000 | Parvin et al. | 710/22 |
| 6,167,486 A | 12/2000 | Lee et al. | 711/120 |
| 6,175,571 B1 | 1/2001 | Haddock et al. | 370/423 |
| 6,185,352 B1 | 2/2001 | Hurley | 385/114 |
| 6,185,676 B1 | 2/2001 | Poplingher et al. | 712/239 |
| 6,186,400 B1 | 2/2001 | Dvorkis et al. | 235/462.45 |
| 6,191,663 B1 | 2/2001 | Hannah | 333/17.3 |
| 6,201,724 B1 | 3/2001 | Ishizaki et al. | 365/49 |
| 6,208,180 B1 | 3/2001 | Fisch et al. | 327/141 |
| 6,212,590 B1 | 4/2001 | Melo et al. | 710/119 |
| 6,219,725 B1 | 4/2001 | Diehl et al. | 710/26 |
| 6,223,301 B1 | 4/2001 | Santeler et al. | 714/6 |
| 6,233,376 B1 | 5/2001 | Updegrove | 385/14 |
| 6,243,769 B1 | 6/2001 | Rooney | 710/56 |
| 6,243,831 B1 | 6/2001 | Mustafa et al. | 714/24 |
| 6,246,618 B1 | 6/2001 | Yamamoto et al. | 365/200 |
| 6,247,107 B1 | 6/2001 | Christie | 711/216 |
| 6,249,802 B1 | 6/2001 | Richardson et al. | 709/200 |
| 6,256,692 B1 | 7/2001 | Yoda et al. | 710/104 |
| 6,266,730 B1 | 7/2001 | Perino et al. | 710/126 |
| 6,272,609 B1 | 8/2001 | Jeddeloh | 711/169 |
| 6,285,349 B1 | 9/2001 | Smith | 345/147 |
| 6,286,083 B1 | 9/2001 | Chin et al. | 711/151 |
| 6,294,937 B1 | 9/2001 | Crafts et al. | 327/158 |
| 6,301,637 B1 | 10/2001 | Krull et al. | 711/112 |
| 6,327,642 B1 | 12/2001 | Lee et al. | 711/120 |
| 6,330,205 B2 | 12/2001 | Shimizu et al. | 365/230.06 |
| 6,347,055 B1 | 2/2002 | Motomura | 365/189.05 |
| 6,349,363 B2 | 2/2002 | Cai et al. | 711/129 |
| 6,356,573 B1 | 3/2002 | Jonsson et al. | 372/46 |
| 6,367,074 B1 | 4/2002 | Bates et al. | 717/11 |
| 6,370,068 B2 | 4/2002 | Rhee | 365/196 |
| 6,370,611 B1 | 4/2002 | Callison et al. | 711/105 |
| 6,373,777 B1 | 4/2002 | Suzuki | 365/230.03 |
| 6,381,190 B1 | 4/2002 | Shinkai | 365/230.03 |
| 6,389,514 B1 | 5/2002 | Rokicki | 711/136 |
| 6,392,653 B1 | 5/2002 | Malandain et al. | 345/501 |
| 6,401,149 B1 | 6/2002 | Dennin et al. | 710/58 |
| 6,401,213 B1 | 6/2002 | Jeddeloh | 713/401 |
| 6,405,280 B1 | 6/2002 | Ryan | 711/105 |
| 6,421,744 B1 | 7/2002 | Morrison et al. | 710/22 |
| 6,430,696 B1 | 8/2002 | Keeth | 713/503 |
| 6,433,785 B1 | 8/2002 | Garcia et al. | 345/531 |
| 6,434,639 B1 | 8/2002 | Haghighi | 710/39 |
| 6,434,696 B1 | 8/2002 | Kang | 713/2 |
| 6,434,736 B1 | 8/2002 | Schaecher et al. | 716/17 |
| 6,438,622 B1 | 8/2002 | Haghighi et al. | 710/1 |
| 6,438,668 B1 | 8/2002 | Esfahani et al. | 711/165 |
| 6,449,308 B1 | 9/2002 | Knight, Jr. et al. | 375/212 |
| 6,453,393 B1 | 9/2002 | Holman et al. | 711/154 |
| 6,457,116 B1 | 9/2002 | Mirsky et al. | 712/16 |
| 6,460,108 B1 | 10/2002 | McCoskey et al. | 710/310 |
| 6,460,114 B1 | 10/2002 | Jeddeloh | 711/120 |
| 6,462,978 B2 | 10/2002 | Shibata et al. | 365/63 |
| 6,463,059 B1 | 10/2002 | Movshovich et al. | 370/389 |
| 6,470,422 B2 | 10/2002 | Cai et al. | 711/129 |
| 6,473,828 B1 | 10/2002 | Matsui | 711/104 |
| 6,477,592 B1 | 11/2002 | Chen et al. | 710/52 |
| 6,477,614 B1 | 11/2002 | Leddige et al. | 711/5 |
| 6,477,621 B1 | 11/2002 | Lee et al. | 711/120 |
| 6,479,322 B2 | 11/2002 | Kawata et al. | 438/109 |
| 6,487,556 B1 | 11/2002 | Downs et al. | 710/101 |
| 6,490,188 B2 | 12/2002 | Nuxoll et al. | 365/63 |
| 6,493,803 B1 | 12/2002 | Pham et al. | 711/147 |

| | | | | | | | |
|---|---|---|---|---|---|---|---|
| 6,496,193 B1 | 12/2002 | Surti et al. | 345/552 | 6,795,899 B2 | 9/2004 | Dodd et al. | 711/137 |
| 6,496,909 B1 | 12/2002 | Schimmel | 711/163 | 6,799,246 B1 | 9/2004 | Wise et al. | 711/117 |
| 6,501,471 B1 | 12/2002 | Venkataraman et al. | 345/424 | 6,799,268 B1 | 9/2004 | Boggs et al. | 712/228 |
| 6,505,287 B2 | 1/2003 | Uematsu | 711/170 | 6,804,760 B2 | 10/2004 | Wiliams | 711/170 |
| 6,523,092 B1 | 2/2003 | Fanning | 711/134 | 6,804,764 B2 | 10/2004 | LaBerge et al. | 711/170 |
| 6,523,093 B1 | 2/2003 | Bogin et al. | 711/137 | 6,807,630 B2 | 10/2004 | Lay et al. | 713/2 |
| 6,526,483 B1 | 2/2003 | Cho et al. | 711/154 | 6,811,320 B1 | 11/2004 | Abbott | 385/58 |
| 6,526,498 B1 | 2/2003 | Mirsky et al. | 712/11 | 6,816,947 B1 | 11/2004 | Huffman | 711/151 |
| 6,539,490 B1 | 3/2003 | Forbes et al. | 713/401 | 6,820,181 B2 | 11/2004 | Jeddeloh et al. | 711/169 |
| 6,552,564 B1 | 4/2003 | Forbes et al. | 326/30 | 6,821,029 B1 | 11/2004 | Grung et al. | 385/92 |
| 6,553,479 B2 | 4/2003 | Mirsky et al. | 712/16 | 6,823,023 B1 | 11/2004 | Hannah | 375/296 |
| 6,564,329 B1 | 5/2003 | Cheung et al. | 713/322 | 6,829,705 B2 | 12/2004 | Smith | 713/1 |
| 6,587,912 B2 | 7/2003 | Leddige et al. | 711/5 | 6,845,409 B1 | 1/2005 | Talagala et al. | 710/20 |
| 6,590,816 B2 | 7/2003 | Perner | 365/200 | 6,889,304 B2 | 5/2005 | Perego et al. | 711/170 |
| 6,594,713 B1 | 7/2003 | Fuoco et al. | 710/31 | 6,904,556 B2 | 6/2005 | Walton et al. | 714/766 |
| 6,594,722 B1 | 7/2003 | Willke, II et al. | 710/313 | 6,910,109 B2 | 6/2005 | Holman et al. | 711/156 |
| 6,598,154 B1 | 7/2003 | Vaid et al. | 712/237 | 6,947,672 B2 | 9/2005 | Jiang et al. | 398/135 |
| 6,615,325 B2 | 9/2003 | Mailloux et al. | 711/154 | 2001/0039612 A1 | 11/2001 | Lee | 713/2 |
| 6,622,227 B2 | 9/2003 | Zumkehr et al. | 711/167 | 2002/0112119 A1 | 8/2002 | Halbert et al. | |
| 6,628,294 B1 | 9/2003 | Sadowsky et al. | 345/568 | 2002/0116588 A1 | 8/2002 | Beckert et al. | 711/161 |
| 6,629,220 B1 | 9/2003 | Dyer | 711/158 | 2002/0144064 A1 | 10/2002 | Fanning | 711/144 |
| 6,631,440 B2 | 10/2003 | Jenne et al. | 711/105 | 2002/0178319 A1 | 11/2002 | Sanchez | 710/305 |
| 6,636,110 B1 | 10/2003 | Ooishi et al. | 327/565 | 2003/0005223 A1 | 1/2003 | Coulson et al. | 711/118 |
| 6,646,929 B1 | 11/2003 | Moss et al. | 365/194 | 2003/0043158 A1 | 3/2003 | Wasserman et al. | 345/545 |
| 6,647,470 B1 | 11/2003 | Janzen | 711/154 | 2003/0043426 A1 | 3/2003 | Baker et al. | 359/109 |
| 6,658,509 B1 | 12/2003 | Bonella et al. | 710/100 | 2003/0035836 A1 | 4/2003 | Pecone | 710/62 |
| 6,662,304 B2 | 12/2003 | Keeth et al. | 713/400 | 2003/0093630 A1 | 5/2003 | Richard et al. | 711/154 |
| 6,665,202 B2 | 12/2003 | Lindahl et al. | 365/49 | 2003/0095559 A1 | 5/2003 | Sano et al. | 370/419 |
| 6,667,895 B2 | 12/2003 | Jang et al. | 365/63 | 2003/0149809 A1 | 8/2003 | Jensen et al. | 710/22 |
| 6,681,292 B2 | 1/2004 | Creta et al. | 711/119 | 2003/0163649 A1 | 8/2003 | Kapur et al. | 711/146 |
| 6,697,926 B2 | 2/2004 | Johnson et al. | 711/167 | 2003/0177320 A1 | 9/2003 | Sah et al. | 711/158 |
| 6,704,817 B1 | 3/2004 | Steinman et al. | 710/100 | 2003/0193927 A1 | 10/2003 | Hronik | 370/351 |
| 6,715,018 B2 | 3/2004 | Farnworth et al. | 710/300 | 2003/0219223 A1 | 11/2003 | Nino, Jr. et al. | 711/105 |
| 6,718,440 B2 | 4/2004 | Maiyuran et al. | 711/137 | 2003/0227798 A1 | 12/2003 | Pax | 365/189.12 |
| 6,721,195 B2 | 4/2004 | Brunelle et al. | 365/63 | 2003/0229762 A1 | 12/2003 | Maiyuran et al. | 711/137 |
| 6,724,685 B2 | 4/2004 | Braun et al. | 365/233 | 2003/0229770 A1 | 12/2003 | Jeddeloh | 711/213 |
| 6,728,800 B1 | 4/2004 | Lee et al. | 710/54 | 2004/0019728 A1 | 1/2004 | Sharma | 710/306 |
| 6,735,679 B1 | 5/2004 | Herbst et al. | 711/167 | 2004/0022094 A1 | 2/2004 | Radhakrishnan et al. | 365/200 |
| 6,735,682 B2 | 5/2004 | Segelken et al. | 711/220 | 2004/0044833 A1 | 3/2004 | Rayan | 711/5 |
| 6,745,275 B2 | 6/2004 | Chang | 710/305 | 2004/0064602 A1 | 4/2004 | George | 710/62 |
| 6,751,113 B2 | 6/2004 | Bhakta et al. | 365/63 | 2004/0122988 A1 | 6/2004 | Han et al. | 710/5 |
| 6,751,703 B2 * | 6/2004 | Chilton | 711/113 | 2004/0126115 A1 | 7/2004 | Levy et al. | 398/116 |
| 6,751,722 B2 | 6/2004 | Mirsky et al. | 712/15 | 2004/0128449 A1 | 7/2004 | Osborne et al. | 711/137 |
| 6,754,117 B2 | 6/2004 | Jeddeloh | 365/201 | 2004/0144994 A1 | 7/2004 | Lee et al. | 257/200 |
| 6,754,812 B1 | 6/2004 | Abdallah et al. | 712/234 | 2004/0158677 A1 | 8/2004 | Dodd | 710/5 |
| 6,756,661 B2 | 6/2004 | Tsuneda et al. | 257/673 | 2004/0236885 A1 | 11/2004 | Fredriksson et al. | 710/100 |
| 6,760,833 B1 | 7/2004 | Dowling | 712/34 | 2005/0044327 A1 | 2/2005 | Howard et al. | 711/147 |
| 6,771,538 B2 | 8/2004 | Shukuri et al. | 365/185.05 | 2005/0071542 A1 * | 3/2005 | Weber et al. | 711/105 |
| 6,775,747 B2 | 8/2004 | Venkatraman | 711/137 | 2005/0166006 A1 | 7/2005 | Talbot et al. | 711/105 |
| 6,785,780 B1 | 8/2004 | Klein et al. | 711/148 | 2005/0246558 A1 | 11/2005 | Ku | 713/300 |
| 6,789,173 B1 | 9/2004 | Tanaka et al. | 711/147 | 2006/0085616 A1 | 4/2006 | Zeighami et al. | 711/167 |
| 6,792,059 B2 | 9/2004 | Yuan et al. | 375/354 | | | | |
| 6,792,496 B2 | 9/2004 | Aboulenein et al. | 710/306 | | | | |

\* cited by examiner

MEMORY HUB AND ACCESS METHOD HAVING INTERNAL PREFETCH BUFFERS

TECHNICAL FIELD

This invention relates to computer systems, and, more particularly, to a computer system having a memory hub coupling several memory devices to a processor or other memory access device.

BACKGROUND OF THE INVENTION

Computer systems use memory devices, such as dynamic random access memory ("DRAM") devices, to store data that are accessed by a processor. These memory devices are normally used as system memory in a computer system. In a typical computer system, the processor communicates with the system memory through a processor bus and a memory controller. The processor issues a memory request, which includes a memory command, such as a read command, and an address designating the location from which data or instructions are to be read. The memory controller uses the command and address to generate appropriate command signals as well as row and column addresses, which are applied to the system memory. In response to the commands and addresses, data are transferred between the system memory and the processor. The memory controller is often part of a system controller, which also includes bus bridge circuitry for coupling the processor bus to an expansion bus, such as a PCI bus.

Although the operating speed of memory devices has continuously increased, this increase in operating speed has not kept pace with increases in the operating speed of processors. Even slower has been the increase in operating speed of memory controllers coupling processors to memory devices. The relatively slow speed of memory controllers and memory devices limits the data bandwidth between the processor and the memory devices.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay of several clock periods. Therefore, although SDRAM devices can synchronously output burst data at a high data rate, the delay in initially providing the data can significantly slow the operating speed of a computer system using such SDRAM devices.

One approach to alleviating the memory latency problem is to use multiple memory devices coupled to the processor through a memory hub. In a memory hub architecture, a system controller or memory controller is coupled to several memory modules, each of which includes a memory hub coupled to several memory devices. The memory hub efficiently routes memory requests and responses between the controller and the memory devices. Computer systems employing this architecture can have a higher bandwidth because a processor can access one memory device while another memory device is responding to a prior memory access. For example, the processor can output write data to one of the memory devices in the system while another memory device in the system is preparing to provide read data to the processor. Although computer systems using memory hubs may provide superior performance, they nevertheless often fail to operate at optimum speed for several reasons. For example, even though memory hubs can provide computer systems with a greater memory bandwidth, they still suffer from latency problems of the type described above. More specifically, although the processor may communicate with one memory device while another memory device is preparing to transfer data, it is sometimes necessary to receive data from one memory device before the data from another memory device can be used. In the event data must be received from one memory device before data received from another memory device can be used, the latency problem continues to slow the operating speed of such computer systems.

One technique that has been used to reduce latency in memory devices is to prefetch data, i.e., read data from system memory before the data are requested by a program being executed. Generally the data that are to be prefetched are selected based on a pattern of previously fetched data. The pattern may be as simple as a sequence of addresses from which data are fetched so that data can be fetched from subsequent addresses in the sequence before the data are needed by the program being executed. The pattern, which is known as a "stride," may, of course, be more complex.

Although data prefetching can reduce memory access latencies in conventional computer systems, prefetching of data has not been effectively used in a manner that provides optimum performance in computer systems using memory hubs. In particular, the vast amount of data that can be addressed in a computer system having several memory hubs makes it difficult to accurately predict which data will be subsequently needed. Furthermore, even if the data that will be required can be correctly anticipated, it can be unduly time consuming to couple the data from memory devices in a memory module, and through a memory hub in the memory module to a prefetch buffer in the system controller or memory controller. The need to couple the data from the memory module to the prefetch buffer can also reduce the memory bandwidth of the system if the data are being prefetched at a time when normal memory accesses are being attempted.

There is therefore a need for a computer architecture that provides the advantages of a memory hub architecture and also minimize the latency problems common in such systems, thereby providing memory devices with high bandwidth and low latency.

SUMMARY OF THE INVENTION

A memory module that may be used in a computer system includes a plurality of memory devices coupled to a memory hub. The memory hub includes a link interface receiving memory requests for access to memory cells in at least one of the memory devices. A memory device interface couples memory requests to the memory devices and receives read data responsive to at least some of the memory requests. A history logic unit included in the memory hub receives memory requests from the link interface and predicts on the basis of the memory requests the addresses in the memory devices that are likely to be accessed. The history logic unit then generates prefetching suggestions indicative of the predicted addresses. The memory hub also includes a memory sequencer that couples memory requests to the memory device interface responsive to memory requests received from the link interface. The memory sequencer also generates and couples prefetching requests to the memory device interface responsive to prefetching suggestions received from the history logic unit. A prefetch buffer included in the memory hub receives and stores read data from memory cells being accessed responsive to the prefetching requests. Finally, a data read control unit included in the memory hub determines from a read memory request received from the link interface if the read data are stored in the prefetch buffer. If the read data are stored in the prefetch buffer, the read data are read from the prefetch buffer. If the read data are not stored in the prefetch buffer, the read data are read from the memory devices.

DETAILED DESCRIPTION OF THE INVENTION

Figure 1:
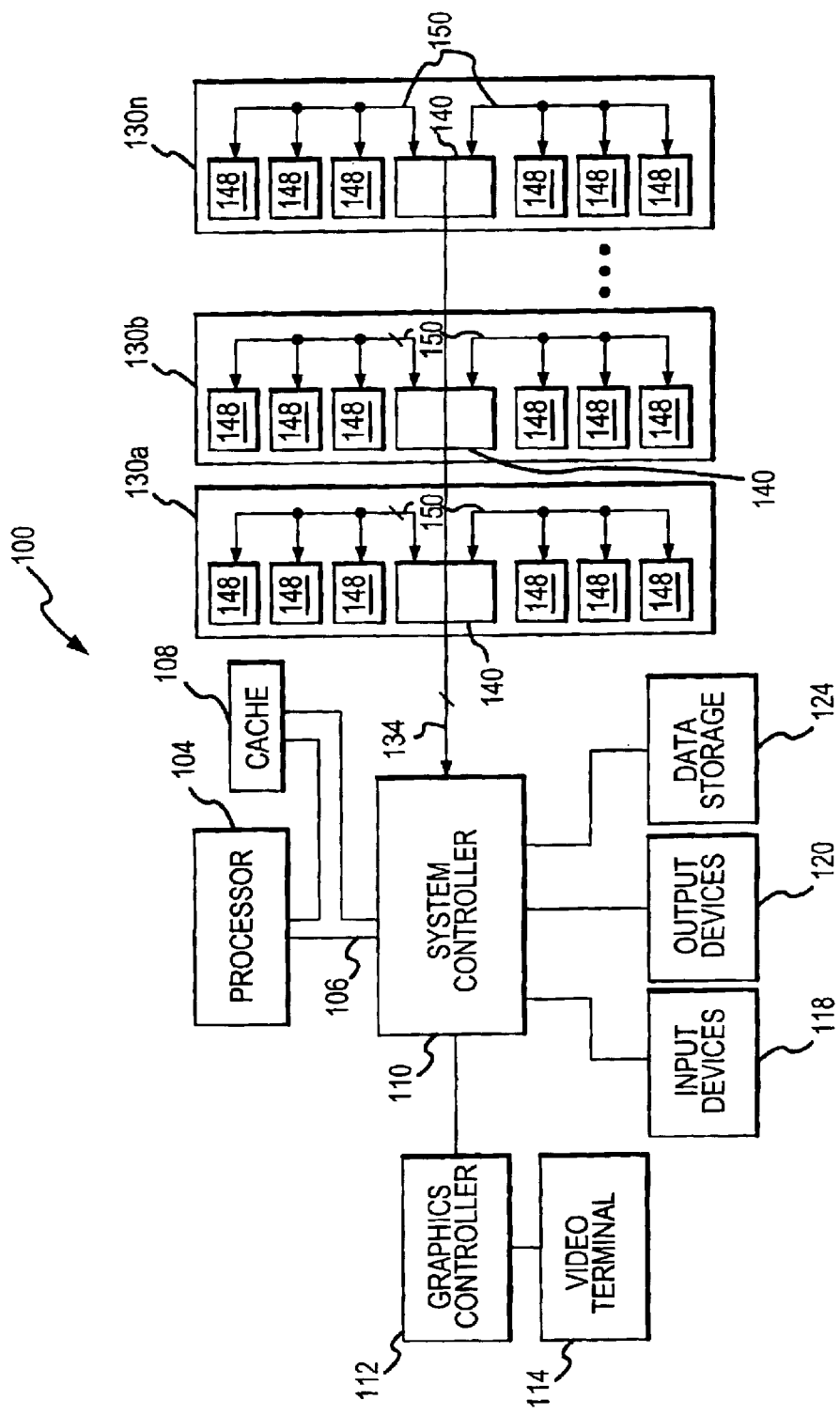
FIG. 1 is a block diagram of a computer system according to one example of the invention in which a memory hub is included in each of a plurality of memory modules.

A computer system 100 according to one example of the invention is shown in FIG. 1. The computer system 100 includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108, which, as previously mentioned, is usually static random access memory ("SRAM"). Finally, the processor bus 106 is coupled to a system controller 110, which is also sometimes referred to as a "North Bridge" or "memory controller."

The system controller 110 serves as a communications path to the processor 104 for a variety of other components. More specifically, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 is coupled to several memory modules 130a,b . . . n, which serve as system memory for the computer system 100. The memory modules 130 are preferably coupled to the system controller 110 through a high-speed link 134, which may be an optical or electrical communication path or some other type of communications path. In the event the high-speed link 134 is implemented as an optical communication path, the optical communication path may be in the form of one or more optical fibers, for example. In such case, the system controller 110 and the memory modules will include an optical input/output port or separate input and output ports coupled to the optical communication path. The memory modules 130 are shown coupled to the system controller 110 in a multi-drop arrangement in which the single high-speed link 134 is coupled to all of the memory modules 130. However, it will be understood that other topologies may also be used, such as a point-to-point coupling arrangement in which a separate high-speed link (not shown) is used to couple each of the memory modules 130 to the system controller 110. A switching topology may also be used in which the system controller 110 is selectively coupled to each of the memory modules 130 through a switch (not shown). Other topologies that may be used will be apparent to one skilled in the art.

Figure 2:
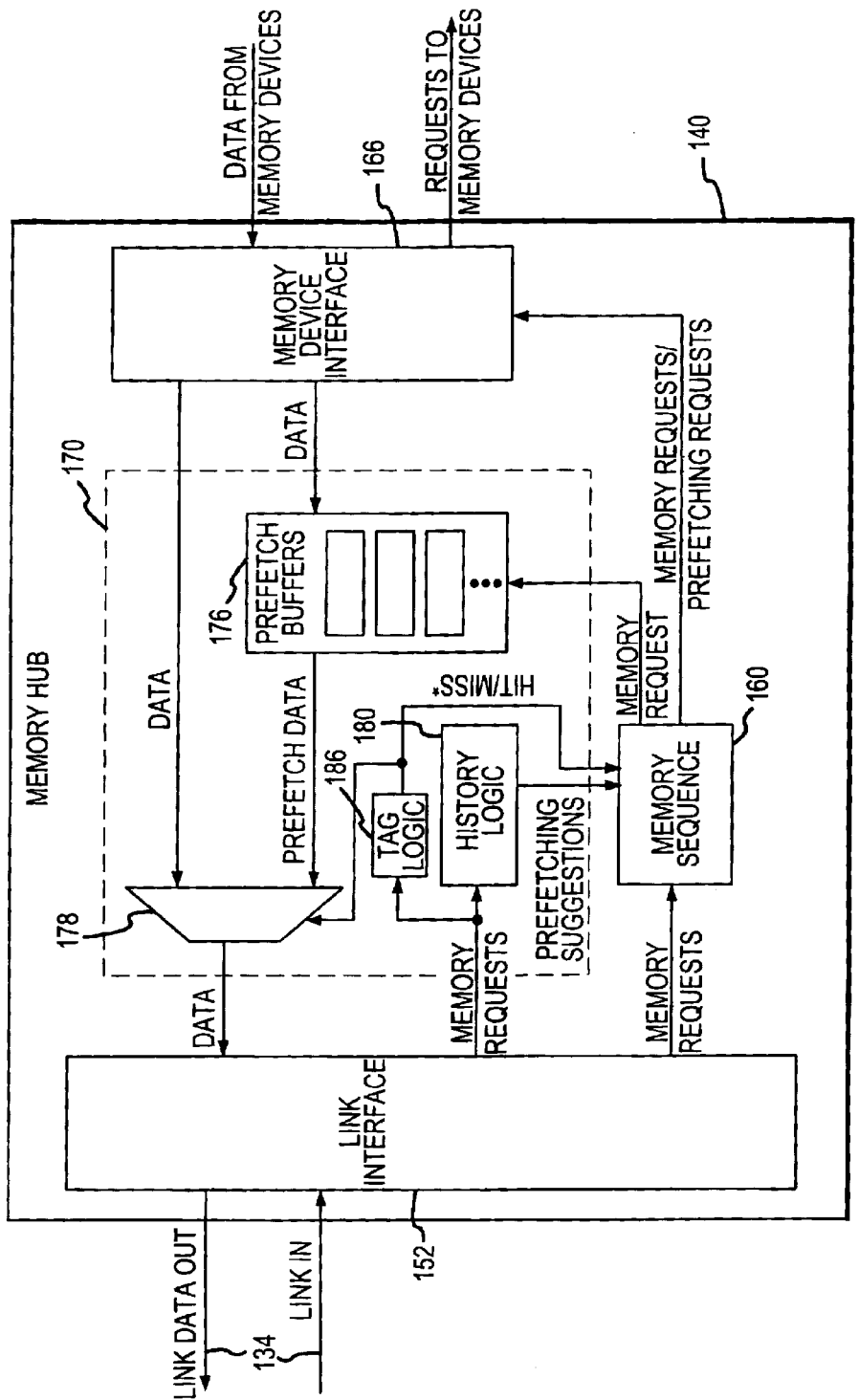
FIG. 2 is a block diagram of a memory hub used in the computer system of FIG. 1, which contains a prefetch buffer according to one example of the invention.

Each of the memory modules 130 includes a memory hub 140 for controlling access to 8 memory devices 148, which, in the example illustrated in FIG. 2, are synchronous dynamic random access memory ("SDRAM") devices. However, a fewer or greater number of memory devices 148 may be used, and memory devices other than SDRAM devices may, of course, also be used. The memory hub 140 is coupled to each of the system memory devices 148 through a bus system 150, which normally includes a control bus, an address bus and a data bus.

One example of the memory hub 140 of FIG. 1 is shown in FIG. 2. The memory hub 140 includes a link interface 152 that is coupled to the high-speed link 134. The nature of the link interface 152 will depend upon the characteristics of the high-speed link 134. For example, in the event the high-speed link 134 is implemented using an optical communications path, the link interface 152 will include an optical input/output port or separate input and output ports and will convert optical signals received through the optical communications path into electrical signals and electrical signals into optical signals that are transmitted to the optical communications path. In any case, the link interface 152 may include a variety of conventional interface circuitry such as, for example, a first-in, first-out buffer (not shown), for receiving and storing memory requests as they are received through the high-speed link 134. The memory requests can then be stored in the link interface until they can be processed by the memory hub 140.

A memory request received by the link interface 152 is processed by first transferring the request to a memory sequencer 160. The memory sequencer 160 converts the memory requests from the format output from the system controller 110 (FIG. 1) into a memory request having a format that can be used by the memory devices 148. These re-formatted request signals will normally include memory command signals, which are derived from memory commands contained in the memory request received by the memory hub 140, and row and column address signals, which are derived from an address contained in the memory request received by the memory hub 140. In the event the memory request is a write memory request, the re-formatted request signals will normally include write data signals which are derived from write data contained in the memory request received by the memory hub 140. For example, where the memory devices 148 are conventional DRAM devices, the memory sequencer 160 will output row address signals, a row address strobe ("RAS") signal, an active low write/active high read signal ("W*/R"), column address signals and a column address strobe ("CAS") signal. The re-formatted memory requests are preferably output from the sequencer 160 in the order they will be used by the memory devices 148.

The memory sequencer 160 applies the re-formatted memory requests to a memory device interface 166. The nature of the memory device interface 166 will again depend upon the characteristics of the memory devices 148. In any case, the memory device interface 166, like the link interface 152, may include a FIFO buffer (not shown), for receiving and storing one or more memory requests as they are received from the link interface 152. The memory request can be stored in the FIFO buffer until they can be processed by the memory devices 148. Alternatively, the memory device interface can simply pass the memory requests to the memory devices 148.

In the event the memory device interface 166 stores several memory requests until they can be processed by the memory devices 148, the memory device interface 166 may re-order the memory requests so that they are applied to the memory devices 148 in some other order. For example, the memory requests may be stored in the interface 166 in a manner that causes one type of request, e.g., read requests, to be processed before other types of requests, e.g., write requests.

The memory requests are described above as being received by the memory hub 140 in a format that is different from the format that the memory requests are applied to the memory devices 148. However, the system controller 110 may instead re-format memory requests from the processor 104 (FIG. 1) to a format that can be used by the memory devices 148. In such case, it is not necessary for the sequencer 160 to re-format the memory request. Instead, the sequencer 160 simply schedules the re-formatted memory request signals in the order needed for use by the memory devices 148. The memory request signals for one or more memory requests are then transferred to the memory device interface 166 so they can subsequently be applied to the memory devices 148.

As previously explained, one of the disadvantages of using memory hubs is the increased latency they can sometimes create. As also previously explained, prefetch approaches that are traditionally used to reduce memory read latency are not well suited to a memory system using memory hubs. In contrast, the memory hub 140 shown in FIG. 2 provides relatively low memory read latency by including a prefetch system 170 in the memory hub 140 that correctly anticipates which data will be needed during execution of a program, and then prefetches those data and stores them in one or more buffers that are part of the prefetch system 170. The prefetch system 170 includes several prefetch buffers 176, the number of which can be made variable depending upon operating conditions, as explained in greater detail below. The prefetch buffers 176 receive prefetched data from the memory device interface 166. The data are stored in the prefetch buffers 176 so that they will be available for a subsequent memory access. The data are then coupled through a multiplexer 178 to the link interface 152.

The prefetch system 170 also includes history logic 180 that receives the memory requests from the link interface 152. The history logic 180 analyzes the memory request using conventional algorithms to detect a pattern or stride from which future memory requests can be predicted. The history logic 180 couples prefetching suggestions to the memory sequencer 160, which then generates corresponding prefetching requests to read the suggested data. The memory sequencer 160 preferably prefetches data from the memory devices 148 for storage in the prefetch buffers 176 when the memory hub 140 is not busy responding to memory requests from the system controller 110. More specifically, when the sequencer 160 is not busy servicing memory requests from the link interface 152, the sequencer 160 generates the prefetch requests based on the prefetching suggestions, which are applied to the memory device interface 166. Prefetch data read from the memory devices 148 responsive to the prefetching requests are stored in the prefetch buffers 176. The prefetch data are stored in the prefetch buffers 176 along with identifying information, such as the address from which the data were read to allow the correct data to be subsequently read from the memory devices 148.

Although data may be prefetched from any address in the memory devices 148, the data are preferably prefetched only from rows in the memory devices 148 that are currently active or "open" so that the prefetching will not require a row of memory cells in the memory devices 148 to be precharged.

The history logic 180 may also detect the existence of several strides from which different sets of memory requests can be predicted. For example, the history logic 180 may detect a first stride containing addresses 100, 101, 102 . . . , a second stride containing addresses 305, 405, 505 . . . , and a third stride containing addresses 300, 304, 308 . . . Data being read responsive to memory requests that are in different strides are preferably stored in different sections of the prefetch buffers 176. The data read from addresses 100, 101, 102 . . . in the first stride are preferably stored in a first section of the prefetch buffers 176, data read from addresses 305, 405, 505 . . . in the second stride are preferably stored in a second section of the prefetch buffers 176, data read from addresses 300, 304, 308 . . . a third stride are preferably stored in a third section of the prefetch buffers 176, etc. Therefore, the history logic 180 also preferably determines the number of strides in existence and enables or creates respective sections of the prefetch buffers 176 to store the data read from the addresses that are in the corresponding stride. The sections of the prefetch buffers 176 may be enabled or created using a variety of conventional techniques. For example, the prefetch buffers 176 may be implemented as a single static random access memory ("SRAM") device that is partitioned into a number of sections corresponding to the number of strides in existence. The prefetch buffers 176 may also be separate registers or memory devices that are enabled as they are needed to store data from a respective stride. Other means of dividing the prefetch buffers 176 into different sections will be apparent to one skilled in the art. For example, in addition to adjusting the number of sections created in the prefetch buffers 176, the history logic 180 may adjust the size of each prefetch buffer section to match the amount of prefetch data in each stride.

The history logic 180 may also selectively enable or disable prefetching depending on whether or not a stride is detected by the history logic 180. However, prefetching may also be enabled all of the time. If the memory requests applied to the history logic 180 have very little locality, i.e., they are for addresses in different rows of memory or are somewhat random, it may be desirable to disable prefetching. If, however, the memory requests applied to the history logic 180 have good locality, the history logic 180 may enable prefetching. Alternatively, the history logic 180 may enable or disable prefetching based on the percentage of memory requests that result in reading the requested data from the prefetch buffers 176 rather than from the memory devices 148.

When a memory module 130 containing a memory hub 140 receives a read memory request, it first determines whether or not the data or instruction called for by the request is stored in the prefetch buffers 176. This determination is made by coupling the memory request to tag logic 186. The tag logic 186 receives prefetch addresses from the history logic 180 corresponding to each prefetch suggestion. Alternatively, the tag logic 186 could receive prefetch addresses from the memory sequencer 160 corresponding to each prefetch request coupled to the memory device interface 166. Other means could also be used to allow the tag logic 186 to determine if data called for by a memory read request are stored in the prefetch buffer 176. In any case, the tag logic 186 stores the prefetch addresses to provide a record of the data that have been stored in the prefetch buffers 176. Using conventional techniques, the tag logic 186 compares the address in each memory request received from the link interface 152 with the prefetch addresses stored in the tag logic 186 to determine if the data called for by the memory request are stored in the prefetch buffers 176. If the tag logic 186 determines the data are not stored in the prefetch buffers 176, it couples a low HIT/MISS* signal to the memory sequencer 160.

The memory sequencer 160 responds to a low HIT/MISS* signal by coupling the memory request received from the link interface 152 to the memory device interface 166 for coupling to the memory devices 148. The data called for by the memory request are then read from the memory devices 148 and coupled to the memory device interface 166. The low HIT/MISS* signal is also applied to the multiplexer 178, thereby causing the multiplexer 178 to couple the read data from the memory device interface 166 to the link interface 152. The time required for all of these events to occur responsive to a memory request can be considerable, and may result in a considerable read latency. It is for this reason that data prefetching is desirable.

If the Tag Logic 186 determines the data called for by a memory request are stored in the prefetch buffers 176, it couples a high HIT/MISS* signal to the memory sequencer 160. The sequencer 160 then couples the memory request received from the link interface 152 to the prefetch buffers 176 rather than to the memory device interface 166, as was the case for a low HIT/MISS* signal. The data called for by the memory request are then read from the prefetched buffers 176 and applied to the multiplexer 178. The high HIT/MISS* signal causes the multiplexer 178 to couple the read data from the prefetch buffers to the link interface 152.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A memory module, comprising:
   a plurality of memory devices; and
   a memory hub, comprising:
      a link interface receiving memory requests for access to memory cells in at least one of the memory devices;
      a memory device interface coupled to the memory devices, the memory device interface being operable to transfer memory requests to the memory devices for access to memory cells in at least one of the memory devices and to receive read data responsive to at least some of the memory requests;
      a history logic unit coupled to the link interface to receive memory requests from the link interface, the history logic being operable to predict addresses that are likely to be accessed in the memory devices based on the memory requests, the history logic unit generating prefetching suggestions indicative of the predicted addresses;
      a memory sequencer coupled to the link interface, the memory device interface and the history logic unit, the memory sequencer being operable to transfer memory requests to the memory device interface responsive to memory requests received from the link interface, the memory sequencer further being operable to generate and transfer prefetch requests to the memory device interface responsive to prefetching suggestions received from the history logic unit;
      a prefetch buffer coupled to the memory device interface for receiving and storing read data from memory cells being accessed responsive to the prefetch requests; and
      a data read control unit coupled to the memory device interface, the link interface and the prefetch buffer, the data read control circuit being operable to determine from a read memory request received from the link interface if the read data are stored in the prefetch buffer, the control unit further being responsive to the read memory request to transfer the read data from the prefetch buffer if the read data are stored in the prefetch buffer and to transfer the read data from the memory device interface if the read data are stored in the memory devices.

2. The memory module of claim 1 wherein the link interface comprises an optical input/output port.

3. The memory module of claim 1 wherein the data read control unit comprises:
   a tag logic unit storing prefetch addresses of read data that have been stored in the prefetch buffer responsive to prefetch requests transferred from the memory sequencer to the memory device interface, the tag logic unit further receiving read memory request addresses from the link interface, comparing each read memory request address to the prefetch addresses stored in the tag logic unit, and outputting an active hit signal in the event of an address match and an inactive hit signal in the event of no address match; and
   a multiplexer having data inputs coupled to the prefetch buffer and to the memory device interface and a data output coupled to the link interface, the multiplexer being operable to transfer the data input from the prefetch buffer to the data output responsive to the active hit signal and to transfer the data input from the memory device interface to the data output responsive to the inactive hit signal.

4. The memory module of claim 3 wherein the tag logic unit is further coupled to the memory sequencer to apply the hit signal to the memory sequencer, and wherein the active hit signal prevents the memory sequencer from transferring a memory request to the memory device interface responsive to a memory request received from the link interface.

5. The memory module of claim 1 wherein the memory sequencer is operable to generate and transfer prefetch requests to the memory device only when memory requests are not being transferred from the link interface to the memory sequencer.

6. The memory module of claim 1 wherein the history logic unit is further operable to group the predicted addresses into a plurality of sets corresponding to respective strides, and wherein the history logic unit is further operable to cause the prefetch buffer to be divided into a plurality of sections each corresponding to a respective stride, the prefetch buffer storing data read from the memory devices responsive to each of the prefetch requests in the section of the prefetch buffer corresponding to the stride containing the address from which the data was read.

7. The memory module of claim 1 wherein the history logic is operable to selectively enable prefetching based on the nature of the memory requests transferred to the link interface.

8. A memory module, comprising:
a plurality of memory devices; and
a memory hub, comprising:
- a link interface receiving memory requests for access to memory cells in at least one of the memory devices;
- a memory device interface coupled to the memory devices, the memory device interface being operable to transfer memory requests to the memory devices for access to memory cells in at least one of the memory devices and to receive read data responsive to at least some of the memory requests;
- a history logic unit coupled to the link interface to receive memory requests from the link interface, the history logic being operable to predict addresses that are likely to be accessed in the memory devices based on the memory requests, the history logic unit generating prefetching suggestions indicative of the predicted addresses;
- a memory sequencer coupled to the memory device interface, the memory sequencer being operable to transfer prefetch requests to the memory device interface responsive to prefetching suggestions received from the history logic unit;
- a prefetch buffer coupled to the memory device interface for receiving and storing read data from memory cells being accessed responsive to the prefetch requests; and
- a data read control unit coupled to the memory device interface, the data read control circuit being operable to determine from a read memory request received from the link interface if the read data are stored in the prefetch buffer.

9. The memory module of claim 8 wherein the link interface comprises an optical input/output port.

10. The memory module of claim 8 wherein the data read control unit comprises a tag logic unit storing prefetch addresses of read data that have been stored in the prefetch buffer responsive to prefetch requests transferred from the memory sequencer to the memory device interface, the tag logic unit further receiving read memory request addresses from the link interface, comparing each read memory request address to the prefetch addresses stored in the tag logic unit, and outputting an active hit signal in the event of an address match.

11. The memory module of claim 8 wherein the memory sequencer is operable to generate and transfer prefetch requests to the memory device only when memory requests are not being transferred from the link interface to the memory sequencer.

12. The memory module of claim 8 wherein the history logic unit is further operable to group the predicted addresses into a plurality of sets corresponding to respective strides, and wherein the history logic unit is further operable to cause the prefetch buffer to be divided into a plurality of sections each corresponding to a respective stride, the prefetch buffer storing data read from the memory devices responsive to each of the prefetch requests in the section of the prefetch buffer corresponding to the stride containing the address from which the data was read.

13. The memory module of claim 8 wherein the history logic is operable to selectively enable prefetching based on the nature of the memory requests transferred to the link interface.

14. A memory hub, comprising:
a link interface receiving memory requests;
a memory device interface operable to output memory requests and to receive read data responsive to at least some of the memory requests;
- a history logic unit coupled to the link interface to receive memory requests from the link interface, the history logic being operable to predict addresses that are likely to be accessed based on the memory requests, the history logic unit generating prefetching suggestions indicative of the predicted addresses;
- a memory sequencer coupled to the link interface, the memory device interface and the history logic unit, the memory sequencer being operable to transfer memory requests to the memory device interface responsive to memory requests received from the link interface, the memory sequencer further being operable to generate and transfer prefetch requests to the memory device interface responsive to prefetching suggestions received from the history logic unit;
- a prefetch buffer coupled to the memory device interface for receiving and storing read data received responsive to the prefetch requests; and
- a data read control unit coupled to the memory device interface, the link interface and the prefetch buffer, the data read control circuit being operable to determine from a read memory request received from the link interface if the read data are stored in the prefetch buffer, the control unit further being responsive to the read memory request to transfer the read data from the prefetch buffer if the read data are stored in the prefetch buffer and to transfer the read data from the memory device interface if the read data are not stored in the prefetch buffer.

15. The memory hub of claim 14 wherein the link interface comprises an optical input/output port.

16. The memory hub of claim 14 wherein the data read control unit comprises:
- a tag logic unit storing prefetch addresses of read data that have been stored in the prefetch buffer responsive to prefetch requests transferred from the memory sequencer to the memory device interface, the tag logic unit further receiving read memory request addresses from the link interface, comparing each read memory request address to the prefetch addresses stored in the tag logic unit, and outputting an active hit signal in the event of an address match and an inactive hit signal in the event of no address match; and
- a multiplexer having data inputs coupled to the prefetch buffer and to the memory device interface and a data output coupled to the link interface, the multiplexer being operable to transfer the data input from the prefetch.buffer to the data output responsive to the active hit signal and to transfer the data input from the memory device interface to the data output responsive to the inactive hit signal.

17. The memory hub of claim 16 wherein the tag logic unit is further coupled to the memory sequencer to apply the hit signal to the memory sequencer, and wherein the active hit signal prevents the memory sequencer from transferring a memory request to the memory device interface responsive to a memory request received from the link interface.

18. The memory hub of claim 14 wherein the memory sequencer is operable to generate and transfer prefetch requests to the memory device only when memory requests are not being transferred from the link interface to the memory sequencer.

19. The memory hub of claim 14 wherein the history logic unit is further operable to group the predicted addresses into a plurality of sets corresponding to respective strides, and wherein the history logic unit is further operable to cause the prefetch buffer to be divided into a plurality of sections each corresponding to a respective stride, the prefetch buffer storing data read from the memory devices responsive to each of the prefetch requests in the section of the prefetch buffer corresponding to the stride containing the address from which the data was read.

20. The memory hub of claim 14 wherein the history logic is operable to selectively enable prefetching based on the nature of the memory requests transferred to the link interface.

21. A memory hub, comprising:
a link interface receiving memory requests;
a memory device interface operable to output memory requests and to receive read data responsive to at least some of the memory requests;
a history logic unit coupled to the link interface to receive memory requests from the link interface, the history logic being operable to predict addresses that are likely to be accessed based on the memory requests, the history logic unit generating prefetching suggestions indicative of the predicted addresses;
a memory sequencer coupled to the memory device interface and the history logic unit, the memory sequencer being operable to transfer prefetch requests to the memory device interface responsive to prefetching suggestions received from the history logic unit;
a prefetch buffer coupled to the memory device interface for receiving and storing read data accessed responsive to the prefetch requests; and
a data read control unit coupled to the memory device interface and the prefetch buffer, the data read control circuit being operable to determine from a read memory request received from the link interface if the read data are stored in the prefetch buffer and to transfer the read data from the prefetch buffer responsive to determining that the read data are stored in the prefetch buffer.

22. The memory hub of claim 21 wherein the link interface comprises an optical input/output port.

23. The memory hub of claim 21 wherein the data read control unit comprises a tag logic unit storing prefetch addresses of read data that have been stored in the prefetch buffer responsive to prefetch requests transferred from the memory sequencer to the memory device interface, the tag logic unit further receiving read memory request addresses from the link interface, comparing each read memory request address to the prefetch addresses stored in the tag logic unit, and outputting an active hit signal in the event of an address match.

24. The memory hub of claim 21 wherein the memory sequencer is operable to generate and transfer prefetch requests to the memory device only when memory requests are not being transferred from the link interface to the memory sequencer.

25. The memory hub of claim 21 wherein the history logic unit is further operable to group the predicted addresses into a plurality of sets corresponding to respective strides, and wherein the history logic unit is further operable to cause the prefetch buffer to be divided into a plurality of sections each corresponding to a respective stride, the prefetch buffer storing data read from the memory devices responsive to each of the prefetch requests in the section of the prefetch buffer corresponding to the stride containing the address from which the data was read.

26. The memory hub of claim 21 wherein the history logic is operable to selectively enable prefetching based on the nature of the memory requests transferred to the link interface.

27. A computer system, comprising:
a central processing unit ("CPU");
a system controller coupled to the CPU, the system controller having an input port and an output port;
an input device coupled to the CPU through the system controller;
an output device coupled to the CPU through the system controller;
a storage device coupled to the CPU through the system controller;
a plurality of memory modules, each of the memory modules comprising:
a plurality of memory devices; and
a memory hub, comprising:
a link interface receiving memory requests for access to memory cells in at least one of the memory devices;
a memory device interface coupled to the memory devices, the memory device interface being operable to transfer memory requests to the memory devices for access to memory cells in at least one of the memory devices and to receive read data responsive to at least some of the memory requests;
a history logic unit coupled to the link interface to receive memory requests from the link interface, the history logic being operable to predict addresses that are likely to be accessed in the memory devices based on the memory requests, the history logic unit generating prefetching suggestions indicative of the predicted addresses;
a memory sequencer coupled to the link interface, the memory device interface and the history logic unit, the memory sequencer being operable to transfer memory requests to the memory device interface responsive to memory requests received from the link interface, the memory sequencer further being operable to generate and transfer prefetch requests to the memory device interface responsive to prefetching suggestions received from the history logic unit;
a prefetch buffer coupled to the memory device interface for receiving and storing read data from memory cells being accessed responsive to the prefetch requests; and
a data read control unit coupled to the memory device interface, the link interface and the prefetch buffer, the data read control circuit being operable to determine from a read memory request received from the link interface if the read data are stored in the prefetch buffer, the control unit further being responsive to the read memory request to transfer the read data from the prefetch buffer if the read data are stored in the prefetch buffer and to transfer the read data from the memory device interface if the read data are stored in the memory devices.

28. The computer system of claim 27 wherein the link interface comprises an optical input/output port.

29. The computer system of claim 27 wherein the data read control unit comprises:
a tag logic unit storing prefetch addresses of read data that have been stored in the prefetch buffer responsive to prefetch requests transferred from the memory sequencer to the memory device interface, the tag logic unit further receiving read memory request addresses from the link interface, comparing each read memory request address to the prefetch addresses stored in the tag logic unit, and outputting an active hit signal in the event of an address match and an inactive hit signal in the event of no address match; and a multiplexer having data inputs coupled to the prefetch buffer and to the memory device interface and a data output coupled to the link interface, the multiplexer being operable to transfer the data input from the prefetch buffer to the data output responsive to the active hit signal and to transfer the data input from the memory device interface to the data output responsive to the inactive hit signal.

30. The computer system of claim 29 wherein the tag logic unit is further coupled to the memory sequencer to apply the hit signal to the memory sequencer, and wherein the active hit signal prevents the memory sequencer from coupling a memory request to the memory device interface responsive to a memory request received from the link interface.

31. The computer system of claim 27 wherein the memory sequencer is operable to generate and transfer prefetch requests to the memory device only when memory requests are not being transferred from the link interface to the memory sequencer.

32. The computer system of claim 27 wherein the history logic unit is further operable to group the predicted addresses into a plurality of sets corresponding to respective strides, and wherein the history logic unit is further operable to cause the prefetch buffer to be divided into a plurality of sections each corresponding to a respective stride, the prefetch buffer storing data read from the memory devices responsive to each of the prefetch requests in the section of the prefetch buffer corresponding to the stride containing the address from which the data was read.

33. The computer system of claim 27 wherein the history logic is operable to selectively enable prefetching based on the nature of the memory requests transferred to the link interface.

34. A computer system, comprising:
a central processing unit ("CPU");
a system controller coupled to the CPU, the system controller having an input port and an output port;
an input device coupled to the CPU through the system controller;
an output device coupled to the CPU through the system controller;
a storage device coupled to the CPU through the system controller;
a plurality of memory modules, each of the memory modules comprising:
a plurality of memory devices; and
a memory hub, comprising:
a link interface receiving memory requests for access to memory cells in at least one of the memory devices;
a memory device interface coupled to the memory devices, the memory device interface being operable to transfer memory requests to the memory devices for access to memory cells in at least one of the memory devices and to receive read data responsive to at least some of the memory requests;
a history logic unit coupled to the link interface to receive memory requests from the link interface, the history logic being operable to predict addresses that are likely to be accessed in the memory devices based on the memory requests, the history logic unit generating prefetching suggestions indicative of the predicted addresses;
a memory sequencer coupled to the memory device interface and the history logic unit, the memory sequencer being operable to transfer prefetch requests to the memory device interface responsive to prefetching suggestions received from the history logic unit;
a prefetch buffer coupled to the memory device interface for receiving and storing read data from memory cells being accessed responsive to the prefetch requests; and
a data read control unit coupled to the memory device interface and the prefetch buffer, the data read control circuit being operable to determine from a read memory request received from the link interface if the read data are stored in the prefetch buffer and to transfer the read data from the prefetch buffer responsive to determining that the read data are stored in the prefetch buffer.

35. The computer system of claim 34 wherein the link interface comprises an optical input/output port.

36. The computer system of claim 34 wherein the data read control unit comprises a tag logic unit storing prefetch addresses of read data that have been stored in the prefetch buffer responsive to prefetch requests transferred from the memory sequencer to the memory device interface, the tag logic unit further receiving read memory request addresses from the link interface, comparing each read memory request address to the prefetch addresses stored in the tag logic unit, and outputting an active hit signal in the event of an address match.

37. The computer system of claim 34 wherein the memory sequencer is operable to generate and transfer prefetch requests to the memory device only when memory requests are not being transferred from the link interface to the memory sequencer.

38. The computer system of claim 34 wherein the history logic unit is further operable to group the predicted addresses into a plurality of sets corresponding to respective strides, and wherein the history logic unit is further operable to cause the prefetch buffer to be divided into a plurality of sections each corresponding to a respective stride, the prefetch buffer storing data read from the memory devices responsive to each of the prefetch requests in the section of the prefetch buffer corresponding to the stride containing the address from which the data was read.

39. The computer system of claim 34 wherein the history logic is operable to selectively enable prefetching based on the nature of the memory requests transferred to the link interface.

40. A method of reading data from a memory module, comprising:
receiving memory requests for access to a memory device mounted on the memory module;
coupling the memory requests to the memory device responsive to the received memory request, at least some of the memory requests being memory requests to read data;
receiving read data responsive to the read memory requests;
predicting addresses that are likely to be accessed in the memory device based on the read memory requests, the address prediction being internal to the memory module;

generating prefetching suggestions indicative of the predicted addresses;

generating prefetch requests responsive to the prefetching suggestions;

coupling the prefetch requests to the memory device;

receiving prefetched read data responsive to the prefetch requests;

storing the prefetched read data in a prefetch buffer;

determining from a read memory request if the requested read data are stored in the prefetch buffer;

coupling the read data from the prefetch buffer if a determination has been made that the read data are stored in the prefetch buffer; and coupling the read data from the memory device if a determination has not been made that the read data are stored in the prefetch buffer.

41. The method of claim 40 wherein the act of receiving memory requests for access to a memory device mounted on the memory module comprises receiving optical signals corresponding to the memory requests.

42. The method of claim 40 wherein the act of determining from a read memory request if the requested read data are stored in the prefetch buffer comprises:

storing prefetch addresses of read data that have been stored in the prefetch buffer responsive to the prefetch requests;

receiving read memory request addresses;

comparing each received read memory request address to the prefetch addresses stored in the tag logic unit; and determining that the requested read data are stored in the prefetch buffer in the event of an address match.

43. The method of claim 42, further comprising:

coupling read data from the prefetch buffer responsive to determining that the requested read data are stored in the prefetch buffer; and coupling read data from the memory device responsive to determining that the requested read data are not stored in the prefetch buffer.

44. The method of claim 40 wherein the act of coupling the prefetch requests to the memory device comprises coupling the prefetch requests to the memory device only when the memory requests are not being received.

45. The method of claim 40, further comprising selectively enabling prefetching based on the nature of the received memory requests.

46. The method of claim 40, further comprising:

grouping the predicted addresses into a plurality of sets corresponding to respective strides;

dividing the prefetch buffer into a plurality of sections each corresponding to a respective stride; and storing data read from the memory device responsive to each of the prefetch requests in the section of the prefetch buffer corresponding to the stride containing the address from which the data was read.

47. A method of reading data from a memory module, comprising:

receiving memory requests for access to a memory device mounted on the memory module;

coupling the memory requests to the memory device responsive to the received memory request, at least some of the memory requests being memory requests to read data;

receiving read data responsive to the read memory requests;

predicting addresses that are likely to be accessed in the memory device based on the read memory requests, the address prediction being internal to the memory module;

generating prefetching suggestions indicative of the predicted addresses;

generating prefetch requests responsive to the prefetching suggestions;

coupling the prefetch requests to the memory device;

receiving prefetched read data responsive to the prefetch requests;

storing the prefetched read data in a prefetch buffer;

determining from a read memory request if the requested read data are stored in the prefetch buffer; and coupling the read data from the prefetch buffer if a determination has been made that the read data are stored in the prefetch buffer.

48. The method of claim 47 wherein the act of receiving memory requests for access to a memory device mounted on the memory module comprises receiving optical signals corresponding to the memory requests.

49. The method of claim 47 wherein the act of determining from a read memory request if the requested read data are stored in the prefetch buffer comprises:

storing prefetch addresses of read data that have been stored in the prefetch buffer responsive to the prefetch requests;

receiving read memory request addresses;

comparing each received read memory request address to the prefetch addresses stored in the tag logic unit; and determining that the requested read data are stored in the prefetch buffer in the event of an address match.

50. The method of claim 49, further comprising:

coupling read data from the prefetch buffer responsive to determining that the requested read data are stored in the prefetch buffer; and coupling read data from the memory device responsive to determining that the requested read data are not stored in the prefetch buffer.

51. The method of claim 47 wherein the act of coupling the prefetch requests to the memory device comprises coupling the prefetch requests to the memory device only when the memory requests are not being received.

52. The method of claim 47, further comprising:

grouping the predicted addresses into a plurality of sets corresponding to respective strides;

dividing the prefetch buffer into a plurality of sections each corresponding to a respective stride; and storing data read from the memory device responsive to each of the prefetch requests in the section of the prefetch buffer corresponding to the stride containing the address from which the data was read.

53. The method of claim 47, further comprising selectively enabling prefetching based on the nature of the received memory requests.

* * * * *

UNITED STATES PATENT AND TRADEMARK OFFICE
CERTIFICATE OF CORRECTION

PATENT NO. : 7,260,685 B2  Page 1 of 1
APPLICATION NO. : 10/601252
DATED : August 21, 2007
INVENTOR(S) : Lee et al.

It is certified that error appears in the above-identified patent and that said Letters Patent is hereby corrected as shown below:

Title Page;
On the face page, in field (56), under "Other Publications", in column 2, line 5, delete ""Free:" and insert -- "Free --, therefor.

In column 10, line 49, in Claim 16, delete "prefetch.buffer" and insert -- prefetch buffer --, therefor.

Signed and Sealed this

Thirteenth Day of November, 2007

JON W. DUDAS
*Director of the United States Patent and Trademark Office*